Nov. 11, 1969

G. L. LETTIERI 3,477,410

READILY REMOVABLE PORTABLE RETRACTABLE
LEASH FOR SMALL ANIMALS

Filed May 15, 1967

INVENTOR.
GERARD L. LETTIERI

BY Constantine A. Michalos

ATTORNEY

United States Patent Office 3,477,410
Patented Nov. 11, 1969

3,477,410
READILY REMOVABLE PORTABLE RETRACTABLE LEASH FOR SMALL ANIMALS
Gerard L. Lettieri, 1094 Edgewood Lane,
Fort Lee, N.J. 07024
Filed May 15, 1967, Ser. No. 638,472
Int. Cl. A01k 27/00
U.S. Cl. 119—109          6 Claims

ABSTRACT OF THE DISCLOSURE

A portable retractable leash for domestic small animals having a spring actuated latch so that the leash can be extended or retracted to any predetermined length and then locked at each desired length by said latch to facilitate better control over the animal. In addition, the least has a snap-on clip which can be easily attached to or removed from a collar or harness of the small animal and be carried in a pocket or handbag leaving the small animal free for movement without having the burden of a leash attached thereon.

BACKGROUND OF THE INVENTION

Field of the invention

The present invention relates generally to domestic animal leashes and more particularly to a simply constructed small size portable and retractable leash for small animals whereby the leash is removed from the collar of the animal and conveniently carried on one's pocket or handbag. In addition, the leash can be retracted to any predetermined length and locked in place at this length to facilitate better control over the animal. Furthermore, the leash can be readily unlocked, extended and relocked in a second predetermined desired length.

Heretofore, it has been the practice to use a conventional leash which may be wound within a casing and this leash assembly remaining attached to the collar or harness while fully retracted and not in use. These devices are unsatisfactory since the connecting assembly is of a substantially permanent character, and the casing will be carried by the animal at all times, and be of a cumbersome nature to the animals movements. In addition, the leash being attached to the collar of the animal will be unattractive to the eye. The heretofore leashes had no efficient means of readily controlling the length of the leash and positively locking the leash at a length which is most desirable for control or training of the animal. That is, when it was desired to have a very short leash, a ring was used which was attached to one part of the leash and a lock was used which was attached to another part of the leash. The leash was then folded over itself and then locked in position. This was unsatisfactory because it made the leash very heavy and bulky and presented the problem of having a multiple length of overlapping leash portions.

Therefore, an object of this invention is to provide a simply constructed and easily operable retractable leash that can be extended or retracted to any desired definite length. Another object of this invention is to provide a retractable leash that is small and compact in size and therefore can be easily removed from the collar of an animal and conveniently carried in a pocket or handbag.

Another object of this invention is to provide a portable retractable leash for domestic small animals having means for locking the leash in any desired length while being readily available for extension or retraction and then locked at a second position.

Still a further object of this invention is to provide a readily removable, portable and retractable leash for small animals for connecting to a collar or harness of an animal, and in which the casing of the leash can be used as a means of attaching an identification card or name plate.

Figure 1:
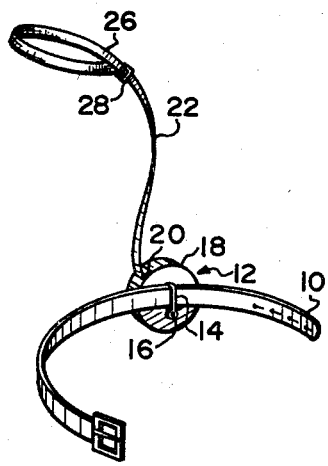
Figure 2:
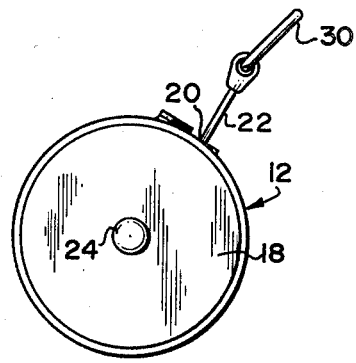
Figure 3:
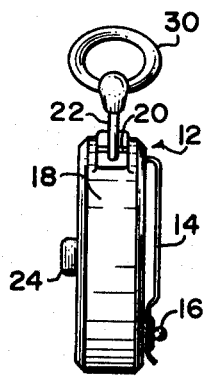
Figure 4:
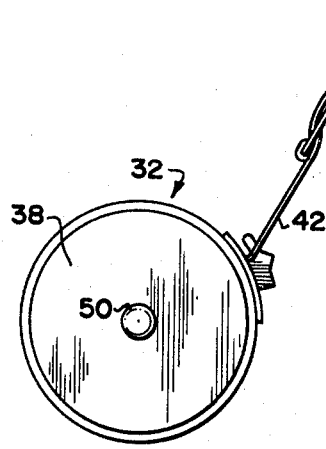
Figure 5:
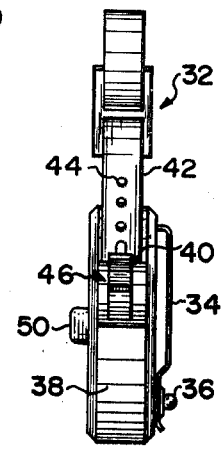
Figure 6:
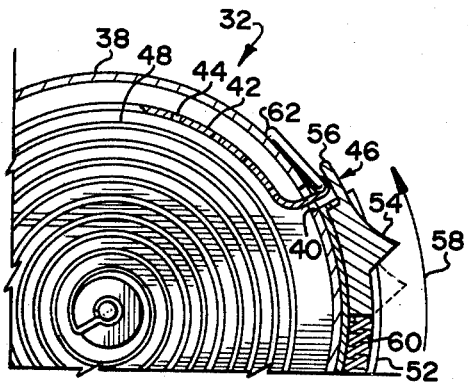
Figure 7:
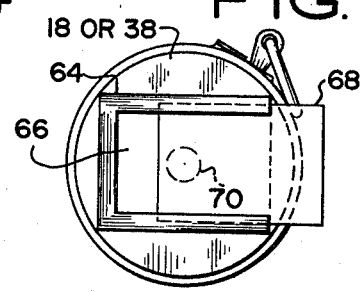

Other objects and many additional advantages will be more readily understood by those skilled in the art after a detailed consideration of the following specification taken with the accompanying drawings wherein:

FIGURE 1 is a view of the leash attached to a dog collar in accordance with an embodiment of this invention;
FIGURE 2 is an enlarged side view of the invention shown in FIGURE 1;
FIGURE 3 is an end view of the invention of FIGURE 2;
FIGURE 4 is an enlarged side view of the invention showing a detailed feature of this invention;
FIGURE 5 is an end view of the invention of FIGURE 4;
FIGURE 6 is an enlarged fragmentary side sectional view of the invention of FIGURES 4 and 5; and
FIGURE 7 is a side view of a third detailed feature of this invention.

Referring to the drawing of FIGURES 1 to 3, there is shown a dog collar 10 in an open position on which is attached a leash assembly 12 by means of a clip 14. The clip can be locked in place by means of a snap lock 16.

The leash assembly 12 comprises a cylindrical housing or casing 18 in which is provided an opening 20 through which extends a spring loaded leash tape 22, the unexposed portion of the leash 22 being wound within the casing 18. A retracting button 24 is used for actuating the spring (not shown) for retracting the leash 22 within the casing 18, and a mere pull on the leash will extend the leash.

The leash 22 may be shortened by forming a loop 26 and locking the loop by a buckle 28, as best shown in FIGURE 1. In place of the locking buckle 28 and loop 26 arrangement, the leash 22 may have a handle or ring 30 for holding the leash in its extended position and for extending the leash 22.

Referring to FIGURES 3 to 6 of the drawing there is shown a leash assembly 32, which has a clip 34 as that of FIGURES 1 to 3. The clip 34 can be locked in place by means of a snap lock 36.

The leash assembly 32 comprises a cylindrical housing or casing 38 in which is provided an opening 40 through which extends a spring loaded leash 42.

The leash 42 includes a plurality of apertures 44 which cooperate with a spring loaded latch device 46. By use of the latch device 46 the leash 42 can be readily unlocked from a first position, extended to a second desired position, and then relocked in this second desired position. An unexposed portion 48, shown in FIGURE 6, being wound within the casing 38.

A retracting button 50 is used for activating the spring (not shown) for retracting the leash 42 within the casing 38, but a positive action has to be performed in order to lock or unlock the leash 42 to thereby extend or retract it. The means of locking and unlocking the leash 42 is provided by the spring loaded latch device 46 which comprises a cylinder 52 in which is supported a thumb-operable piston or rod 54 having a pin 56 insertable within the predetermined aperture 44 depending on the extended leash length desired.

When the thumb pressure is removed the piston 54 moves, as shown by arrow 58, by a spring 60 operable within the cylinder 52 to hook into one of the apertures 44 or to hold down a buckle 62 at the end of the leash 42. It should be noted that the overall unit presents a small compacted assembly when the thumb-operable piston 54 is used to hold down the buckle 62 next to the casing 38 thereby preventing the buckle 62 from hooking onto another article carried in one's pocket or pocketbook when he or she is also carrying the leash assembly 32.

FIGURE 7, shows the casing 18 or 38 of the leash assembly 12 or 32 supporting a suitable frame 64 having a transparent window 66 in which is inserted a name plate or identification card 68. A retracting button 70 is placed under the name plate frame 64 and can be operable there through so that the other side of the casing 18 or 38 may be free to support the clip 14 or 34, shown in FIGURES 3 and 5, respectively.

While the present invention has been described in a preferred embodiment, it will be obvious to those skilled in the art that various modifications can be made therein within the scope of the invention.

What is claimed is:

1. A retractable, adjustable portable leash assembly for attaching to the collar or harness of a small domestic animal comprising a casing, a leash tape operably retractable within said casing, a clip having one end affixed to said casing for attaching said leash assembly to the collar or harness of the domestic small animal, said clip having a second end extended portion for projecting beyond the cross-sectional width of the collar or harness, a snap-lock releasably connecting said extended end portion of said clip to said casing and thereby locking said clip to said casing for securely holding the casing and leash assembly to the collar or harness of the small animal, a retracting button on the circumference of said casing and operable for retracting said leash tape within said casing, and including means for contacting said tape and securing the leash tape at a predetermined desired length for facilitating better control over the animal.

2. The structure of claim 1, wherein said clip has the snap-lock interposed between its extended portion and said casing and thereby presenting a quick and better secured means of retaining said leash assembly onto the collar or harness of the small animal.

3. The structure of claim 1, wherein the means for shortening the leash tape including a locking buckle at the end of said leash tape operably threading said leash tape and locking it in position after forming a loop with said leash tape to thereby effectively shorten the leash tape and at the same time having the loop as a more efficient means of holding the leash tape for better control over the animal.

4. The structure of claim 1, wherein said means for shortening the tape includes apertures extending the length of the tape, a spring-loaded latch device having a pin insertable within a predetermined aperture for securing the tape at a predetermined desired length.

5. The structure of claim 1, wherein said casing includes an opening through which said leash tape extends through and wherein said means for shortening the tape includes apertures extending the length of the tape, a cylinder secured on the casing and having an opening tangentially facing the opening of said casing, a thumb-operable piston having a pin extending through the opening of said cylinder, and a spring within said cylinder operably extending said piston with said pin within a predetermined aperture of said tape when the tape is at a predetermined desired length for locking said tape at said desired length.

6. The structure of claim 1 further comprising a frame supported on one flat portion of said casing, and a transparent window whereby said frame can operably receive a name plate or identification card therein for viewing.

References Cited

UNITED STATES PATENTS

| 669,809 | 3/1901 | Schwab | 242—107.6 |
| 1,708,302 | 4/1929 | Cohen | 242—107.1 |
| 1,887,491 | 11/1932 | Johnson | 119—109 |
| 2,314,504 | 3/1943 | Lifchultz | 242—107.4 |
| 2,458,489 | 1/1949 | Hallander | 119—109 |
| 2,586,386 | 2/1952 | Ryan | 242—107.6 |
| 2,776,644 | 1/1957 | Fontaine | 119—109 |
| 2,833,250 | 5/1958 | Beebe | 119—109 |
| 2,889,807 | 6/1959 | Beebe | 119—109 |
| 2,909,154 | 10/1959 | Thomas | 119—109 |
| 2,994,300 | 8/1961 | Grahling | 119—109 |
| 3,250,253 | 5/1966 | Galin | 119—109 |

ALDRICH, F. MEDBERY, Primary Examiner